Patented Jan. 29, 1935

1,989,374

UNITED STATES PATENT OFFICE 1,989,374

BITUMINOUS EMULSION AND PROCESS OF PREPARING IT

Kenneth E. McConnaughay, Indianapolis, Ind., assignor to Pre Cote Corporation, Indianapolis, Ind., a corporation of Indiana No Drawing. Application December 19, 1930
Serial No. 503,494

3 Claims. (Cl. 134—1)

My invention is concerned with an asphalt or bitumen emulsion suitable for use in the production of paving material and especially adapted for use in the process of paving-material production set forth and described in my co-pending application Serial No. 511,051, filed January 24, 1931.

In the process of my aforesaid co-pending application, the paving material is produced by first submerging the aggregate in liquefied bitumen and then removing it and permitting excess bitumen to drain from the aggregate. I contemplate that the aggregate will be removed from the liquid bitumen by means of a conveyor comprising a series of buckets which, in their movement, dip into the bitumen, become loaded with a mixture of aggregate and bitumen, and are then elevated while excess bitumen drains from the aggregate.

One method applied to a considerable extent in liquefying bitumen for use in the production of paving material is that of emulsification. In the main, the emulsified bitumens which have heretofore been in use are satisfactory, but they possess certain disadvantageous features, and their use in the process of my aforesaid application is frequently accompanied with considerable difficulty.

The emulsified bitumens in general use prior to my invention have been produced in central plants and shipped, sometimes over long distances, to the point of use. These emulsions must be capable of remaining stable for a long period of time in order to provide for their transportation and also for a possible long delay before their use. To produce emulsions of such stability in quantity, comparatively large and expensive plants are required; and this, together with the fact that transportation charges must be paid on the increased weight caused by the water-content of the emulsion, increases the cost of emulsified bitumens.

In order to produce a bituminous emulsion which will remain stable for a long period of time, as is required when the emulsion is produced at a central plant and distributed in quantity to the places of use, it is necessary that the emulsion contain a considerable portion of a suitable emulsifying agent.

The emulsifying agents in general use usually are mixtures of a surface-tension-depressant, such as a soap, and gelatinous or colloidal material. The amount of emulsifying agent present in prior emulsions depends to a large extent upon the nature of the bitumen which is incorporated in the emulsion, harder bitumens requiring more emulsifying agents than softer bitumens. Except in the case of an extremely soft bitumen which is practically a heavy oil, I know of no prior bitumen emulsions in which the percentage of emulsifying agent is less than 3%–4% by weight of the bitumen content.

The materials in common use as emulsifying agents have a deleterious effect on pavements produced from bitumen emulsions in that such agents have a marked tendency to decrease the ductility of the bitumen. This effect may be at least partially compensated for by using a bitumen of high penetration; but high penetration bitumens produce comparatively soft pavements which will not wear so well as will pavements which include low-penetration bitumens.

Because the bitumens of low-penetration and low ductility require large proportions of emulsifying agents and because the emulsifying agents have a marked tendency to decrease the ductility of the bitumen, it has been difficult to produce a paving mixture of satisfactory ductility from an emulsified bitumen of high penetration.

In the laying of pavement with the use of a bitumen emulsion, the emulsion and aggregate are mixed to coat the aggregate particles with emulsion, and the coated aggregate is then distributed upon the road and rolled. It is essential to the production of satisfactory pavements that the emulsion be broken down before the completion of the rolling operation, as the emulsion lacks the desired binding qualities possessed by bitumen alone. The bitumen emulsions in general use, because of their comparatively great stability, frequently do not break down soon enough, and the laying of pavement is therefore delayed. In addition to the inconvenience caused by this delay, these emulsions have a further disadvantage in that if it rains on the coated aggregate before the emulsion has broken down the emulsion may be washed away from the aggregate carrying the bitumen with it.

I have found that emulsified bitumens have a further disadvantage when used in the process of my aforesaid pending application. In that process, as previously pointed out, the movement of conveyor-buckets through the supply of emulsion produces agitation thereof; and if the emulsion, when introduced into the machine, is a nearly perfect emulsion otherwise capable of remaining stable for almost an indefinite period, this agitation has a tendency to break down the emulsion.

It is the object of my invention to produce a bituminous emulsion which can be made in quantity in a small portable plant, which can be used satisfactorily in the process of my aforesaid co-pending application, and in which the emulsifying agents used will not have a markedly harmful effect on the bitumen.

In carrying out my invention, I prepare an emulsion of bitumen and water, the emulsification being aided by the use of a suitable soap present in proportionate quantity much smaller than in prior emulsified bitumens of which I am aware. Desirably, the soap is formed in the emulsifying process by the saponification of an oil or fatty acid with any suitable alkali. I have found it desirable to mix the bitumen, in melted condition, with the oil or fatty acid and to bring this mixture into contact with water in which the proper proportion of alkali has been dissolved. Upon mixing these two components, the oil or fatty acid is saponified by the action of the alkali, and serves to facilitate the formation of the desired emulsion.

One emulsion embodying my invention may have the following composition, the proportions being by weight:

| | Parts |
|---|---|
| Asphalt | 1,000 |
| Water | 1,000 |
| Red oil | 7 |
| Caustic soda | 1 |

In the preparation of an emulsion of the above composition, the asphalt is first melted by heating it to a temperature of about 250° F., and the red oil, which is commercial oleic acid, is thoroughly intermixed with it. The water may also be heated, preferably to a temperature in the neighborhood of 150° F., and the caustic soda is dissolved in it. This caustic soda solution is then introduced into the mixture of asphalt and red oil and the whole mixture is thoroughly agitated. Desirably, this agitation is no more than a violent stirring, as I have found it unnecessary if not actually undesirable to pass the mixture through a colloid mill or other apparatus in which the emulsion would be subjected to a grinding action.

It can be produced in a small portable plant adjacent the apparatus in which the emulsion and aggregate are mixed to form the paving material; and the period during which the emulsion remains stable is ample to provide for mixing it with the aggregate, transmitting the treated aggregate to the place which it is to be laid, distributing it, and rolling it.

The ingredients which my emulsion may contain are subject to considerable variation. Thus, instead of asphalt, I may employ tar or a mixture of tar and asphalt. Instead of red oil, (oleic acid,) I may employ linseed oil, olive oil, other vegetable oils, or corresponding fatty acids. I prefer to use the fatty acids rather than the oils, as they react more readily with the alkali to form a soap. In the place of soda-ash I may use another relatively strong alkali, such as potash.

The relative proportions of bitumen and water may be varied to suit conditions. In general, if the aggregate which is to be coated by the emulsion is damp or wet, the proportion of water in the emulsion will be decreased. The size of the aggregate may also affect the relative proportions of water and bitumen in the emulsion, particularly if the emulsion is to be used in the production of paving material by the process set forth in my co-pending application Serial No. 511,051. In that process, the amount of emulsion contained in the paving material will vary with the viscosity of the emulsion. It is sometimes desirable in the preparation of paving material that large aggregate particles carry heavier coatings of bitumen than smaller particles. Further, if large-particle aggregate is used in the paving material produced by the process of my aforesaid co-pending application, the emulsion will drain from it more readily than from small-particle aggregate. As a result of this, it is desirable that large-particle aggregate be treated with an emulsion which is more viscous than that used in treating small-particle aggregate; and to produce this more viscous emulsion for use with large-particle aggregate I may decrease the water content of the emulsion.

For most uses, an emulsion containing approximately equal parts of bitumen and water will prove satisfactory, and in all but a few cases, the bitumen content of the emulsion will lie between 40% and 60%. In certain extreme cases, it may be desirable to employ as little as 30% bitumen or as much as 70%.

The proportion of the ingredients used in forming the emulsifying soap is also subject to considerable variations. When a quick-breaking emulsion is desired, the proportion of emulsifying agent may be lower; or if an emulsion of greater stability is desired, the proportion of the emulsifying agent may be increased. I have never found it necessary, however, and I do not believe it desirable, to use more emulsifying agent than approximately 1% by weight of the bitumen content of the emulsion.

The alkali and oil or fatty acid which react with each other to form the emulsifying soap should be present in equivalent reacting quantities, as an excess of either has a tendency to interfere with the formation of a suitable emulsion.

I find that hard water, if untreated, has a tendency to prevent the formation of an emulsion of the desired character. It frequently happens that with a portable plant such as I may employ in the production of my emulsion, hard water is the only water available in sufficient quantity. In order to avoid the detrimental effect which follows the use of hard water in the emulsion, I may treat the water with sufficient sodium fluoride to precipitate the calcium and magnesium which are present as salts in the water and are responsible for its temporary hardness. The resultant reactions, which reach completion under the influence of heat, are represented by the following equations:

$$Ca(HCO_3)_2 + 2NaF = CaF_2 + Na_2CO_3 + H_2O + CO_2$$
$$Mg(HCO_3)_2 + 2NaF = MgF_2 + Na_2CO_3 + H_2O + CO_2$$

It will be noted that in both the above reactions sodium carbonate is formed. This is highly desirable, as it renders the water alkaline and decreases the amount of alkali which must be added for the purpose of saponifying the oil or fatty acid. The same result can be obtained by treating the hard water with potassium fluoride.

While my process may be carried out in apparatus of different forms, I have found it desirable to employ the emulsifier illustrated in my patent No. 1,941,808. This emulsifier provides for the intermixing of the bitumen and oil or fatty acid before they are brought into contact with the water and dissolved alkali and also for the thorough agitation of the whole mixture. The apparatus is simple and light in weight, and it may therefore be conveniently transported to any location where it is to be used.

After a bituminous emulsion has been mixed with aggregate and when the emulsion breaks, the water content of the emulsion drains off leaving the bitumen and aggregate mixture in the form of a finished pavement. The breaking of such emulsions as have been described above occurs rather abruptly, so that in a short space of time the paving mixture is transformed from comparatively plastic material to one which has set.

This sudden change in the nature of the paving material may be, and frequently is, undesirable. It can be prevented by incorporating in the paving mixture, and desirably in the emulsion before mixing with the aggregate, some bitumen solvent such as naphtha or other petroleum distillate. Such a solvent will remain in association with the bitumen after the emulsion breaks and the water content thereof drains off, and will have the effect of maintaining the bitumen in a soft and workable condition for a period of time the length of which depends upon the proportionate amount of solvent present. As the solvent evaporates, the bitumen hardens.

As just stated, I find it desirable to incorporate the solvent, if one is used, in the emulsion before it is mixed with the aggregate. This is conveniently accomplished by mixing the solvent with the oil or acid which constitutes one component of the emulsifying soap, and by then introducing this mixture into the melted bitumen just as the oil or fatty acid alone is introduced if no solvent is used.

As an example of an emulsion made from extremely hard water and including a bitumen-solvent, the following ingredients may be used in the approximate proportions noted.

| | Parts by weight |
|---|---|
| Water | 5,000 |
| Bitumen | 5,000 |
| Sodium fluoride | 2 |
| Caustic soda | 3 |
| Red oil | 35 |
| Naphtha | 500 |

The preferred method of making an emulsion with the above ingredients is to mix the naphtha and oleic acid (red oil) and introduce them, with stirring, into the melted bitumen. The sodium fluoride and caustic soda are dissolved in the water, and this solution is then mixed with the melted bitumen into which the oleic acid and naphtha have been introduced. Upon thorough agitation of this mixture, the desired emulsion will be produced.

Such an emulsion will remain stable for a period of time ample to permit it to be mixed with aggregate, spread on the road, and rolled. When the emulsion breaks, the naphtha will prevent too prompt setting of the paving mixture, the bitumen remaining soft enough to permit the pavement to be planed or graded in order to remove inequalities or irregularities which sometimes develop under the roller.

Under certain circumstances, particularly where the bitumen to be incorporated in the emulsion is of low penetration, it may be desirable to mix the solvent or flux with the bitumen rather than with the saponifiable material. Whether the solvent is mixed with the bitumen or with the saponifiable material, it facilitates the dispersion of the bitumen in the water and thereby aids in the process of emulsification. It may be desirable to use a solvent or flux solely for this purpose and independently of its effect in increasing the period during which the resultant paving material is workable. When such is the case, the amount of solvent or flux used is preferably such that the fluxed bitumen will reach the emulsifying machine with a viscosity at least no greater than that of 100 to 120 penetration bitumen at 250° F.

There are a number of materials which can be used as solvents or fluxes for the bitumen. Among such substances are naphtha, which has been mentioned, gasoline, kerosene, or other petroleum distillates. When the solvent or flux is employed solely to produce a temporary effect, as to decrease the viscosity of the bitumen prior to emulsification or to increase the time during which the paving material is workable, the solvent should of course be volatile; and I regard any volatile bitumen solvent as within the scope of my invention.

For most purposes, the naphtha or other bitumen solvent may be present in quantity approximately ten percent (10%) by weight of the bitumen-content of the emulsion. This proportion may be varied to suit conditions, however; the amount of solvent being increased to lengthen the time during which the pavement is workable and decreased to shorten such time.

The use of a bitumen solvent as above set forth is particularly desirable in cold weather, and further it aids in the emulsification of the bitumen and decreases the amount of emulsifying agent necessary to produce an emulsion of the desired stability.

I claim as my invention:

1. The process of making an emulsion of bitumen and hard water, which comprises treating the hard water with the fluoride of an alkali metal to precipitate at least a part of the ingredients responsible for hardness and to render the water alkaline, adding additional alkali to the water, separately melting bitumen and adding thereto saponifiable material, and mixing such bitumen and saponifiable material with the water to effect substantially complete emulsification of the bitumen.

2. The process of making an emulsion of bitumen and hard water, which comprises treating the hard water with the fluoride of an alkali metal to precipitate at least a part of the ingredients responsible for hardness and to render the water alkaline, separately melting bitumen and adding thereto saponifiable material, and mixing such bitumen and saponifiable material with the water to effect substantially complete emulsification of the bitumen.

3. The process of making an emulsion of bitumen and hard water, which comprises treating the hard water with sodium fluoride to precipitate at least a part of the ingredients responsible for hardness and to render the water alkaline, adding additional alkali to the water, separately melting bitumen and adding thereto saponifiable material, and mixing such bitumen and saponifiable material with the water to effect substantially complete emulsification of the bitumen.

KENNETH E. McCONNAUGHAY.